US007738415B2

(12) United States Patent
    Chou

(10) Patent No.: US 7,738,415 B2
(45) Date of Patent: Jun. 15, 2010

(54) METHODS AND APPARATUS FOR PROVIDING A PACKET CLASSIFICATION PROTOCOL ASSOCIATED WITH A BROADCAST WIRELESS ACCESS NETWORK

(75) Inventor: Joey Chou, Scottsdale, AZ (US)

(73) Assignee: Intel Corporation, Santa Clara, CA (US)

(*) Notice: Subject to any disclaimer, the term of this patent is extended or adjusted under 35 U.S.C. 154(b) by 1068 days.

(21) Appl. No.: 11/394,627

(22) Filed: Mar. 31, 2006

(65) Prior Publication Data

US 2006/0251077 A1    Nov. 9, 2006

Related U.S. Application Data

(60) Provisional application No. 60/673,424, filed on Apr. 20, 2005.

(51) Int. Cl.
    *H04W 4/00* (2009.01)
    *H04W 36/00* (2009.01)
(52) U.S. Cl. .................... 370/328; 370/338; 455/435.1; 455/439; 709/225
(58) Field of Classification Search ........................ None
    See application file for complete search history.

(56) References Cited

U.S. PATENT DOCUMENTS

| 7,339,913 | B2* | 3/2008 | Chou et al. ................. 370/338 |
| 2002/0067742 | A1* | 6/2002 | Or et al. ...................... 370/466 |
| 2005/0094663 | A1* | 5/2005 | Rahman et al. ............. 370/466 |
| 2005/0271021 | A1* | 12/2005 | Alemany et al. ............ 370/338 |

OTHER PUBLICATIONS

Hyung-Deug Bae et al., "Network architectures for packet classification in wireless mobile network," Vehicular Technology Conference, 2004 IEEE 60th Los Angeles, CA, USA, Sep. 26-29, 2004, pp. 4965-4968, XP010790519.
Guosong Chu et al., "A QoS architecutre for the MAC protocol of IEEE 802.16 BWA system," Communications, Circuits and Systems and West Sino Expositions, IEEE 2002 International Conference, Jun. 29, 2002, pp. 435-439, XP010632295.
Nair et al., "IEEE 802.16 Medium Access Control and Service Provisioning," Intel Technology Journal, vol. 8, Issue 3, 2004, pp. 1-15.

* cited by examiner

*Primary Examiner*—Pankaj Kumar
*Assistant Examiner*—Marcus R Smith
(74) *Attorney, Agent, or Firm*—Schwabe, Williamson & Wyatt, P.C.

(57) ABSTRACT

Embodiments of methods and apparatus for providing a packet classification protocol associated with a broadband wireless access network are generally described herein. Other embodiments may be described and claimed.

28 Claims, 9 Drawing Sheets

300 ⟶

Classifier Rule Table

| Service Flow Identifier | Classifier Index | Destination MAC Address Rule | IP Destination Address Rule | ... | IP Source Address Rule |
|---|---|---|---|---|---|
| 101 | 10 | 55 | 21 | ... | -- |
| 102 | 13 | 56 | -- | ... | -- |
| ... | ... | ... | ... | ... | ... |
| 103 | -- | -- | -- | ... | -- |

310 — row 101; 320 — row 102; 325 — row 103; 330, 340, 350, 360 — column markers

Destination MAC Address Rule Table

| Destination MAC Address Rule Index | Destination MAC Address List Index | Destination MAC Address | Destination MAC Mask |
|---|---|---|---|
| 55 | 1 | df:24:5a:56 | ff:ff:ff:00 |
| 55 | 2 | df:24:5a:57 | ff:ff:ff:00 |
| 55 | 3 | df:24:5a:58 | ff:ff:ff:00 |
| 55 | 4 | df:24:5a:59 | ff:ff:ff:00 |
| 55 | 5 | df:24:5a:5a | ff:ff:ff:00 |
| ... | ... | ... | ... |
| 56 | 1 | be:23:8c:30 | ff:ff:ff:00 |

610, 620, 630, 640, 650 — data rows; 655 — last row; 660, 670, 680, 690 — column markers

```
wmanIfBsClassifierRuleTable OBJECT-TYPE
        SYNTAX          SEQUENCE OF WmanIfBsClassifierRuleEntry
        MAX-ACCESS  not-accessible
        STATUS          current
        DESCRIPTION
                "This table contains packet classifier rules associated with
        service flows."
        REFERENCE
                "Subclause 11.13.19.3.4 in IEEE Std 802.16-2004"
        ::= { wmanIfBsPacketCs 4 } wmanIfBsClassifierRuleEntry::= SEQUENCE {
        wmanIfBsClassifierRuleIndex             Unsigned32,
        wmanIfBsClassifierRulePriority          INTEGER,
        wmanIfBsClassifierRuleIpTosLow          INTEGER,
        wmanIfBsClassifierRuleIpTosHigh         INTEGER,
        wmanIfBsClassifierRuleIpTosMask         INTEGER,
        wmanIfBsClassifierRuleIpProtocol        Integer32,
        wmanIfBsClassifierRuleIpSourceAddr      InetAddress,
        wmanIfBsClassifierRuleIpSourceMask      InetAddress,
        wmanIfBsClassifierRuleIpDestAddr        InetAddress,
        wmanIfBsClassifierRuleIpDestMask        InetAddress,
        wmanIfBsClassifierRuleSourcePortStart   Integer32,
        wmanIfBsClassifierRuleSourcePortEnd     Integer32,
        wmanIfBsClassifierRuleDestPortStart     Integer32,
        wmanIfBsClassifierRuleDestPortEnd       Integer32,
        wmanIfBsClassifierRuleDestMacAddr       MacAddress,
        wmanIfBsClassifierRuleDestMacMask       MacAddress,
        wmanIfBsClassifierRuleSourceMacAddr     MacAddress,
        wmanIfBsClassifierRuleSourceMacMask     MacAddress,
        wmanIfBsClassifierRuleEnetProtocolType  INTEGER,
        wmanIfBsClassifierRuleEnetProtocol      Integer32,
        wmanIfBsClassifierRuleUserPriLow        Integer32,
        wmanIfBsClassifierRuleUserPriHigh       Integer32,
        wmanIfBsClassifierRuleVlanId            Integer32,
        wmanIfBsClassifierRuleState             INTEGER,
        wmanIfBsClassifierRulePhsSize           Integer32,
        wmanIfBsClassifierRulePhsMask           OCTET STRING,
        wmanIfBsClassifierRulePhsVerify         WmanIfPhsRuleVerify,
        wmanIfBsClassifierRuleIpv6FlowLabel     WmanIfIpv6FlowLabel,
        wmanIfBsClassifierRuleBitMap            WmanIfClassifierBitMap,
        wmanIfBsClassifierRuleRowStatus         RowStatus} wmanIfBsClassifierIndex    OBJECT-TYPE
                SYNTAX          Unsigned32 (1..4294967295)
                MAX-ACCESS  not-accessible
                STATUS          current
                DESCRIPTION
                        "An index is assigned to a classifier in BS classifiers table"
                ::= { wmanIfBsClassifierRuleEntry 1 }
```

```
wmanIfCmnClassifierRuleTable OBJECT-TYPE
        SYNTAX              SEQUENCE OF WmanIfCmnClassifierRuleEntry
        MAX-ACCESS  not-accessible
        STATUS              current
        DESCRIPTION
                "This table contains packet classifier rules associated with
        service flows."
        REFERENCE
                "Subclause 11.13.19.3.4 in IEEE Std 802.16-2004"
        ::= { wmanIfCmnPacketCs 1 } wmanIfCmnClassifierRuleEntry::= SEQUENCE {
        wmanIfCmnClassifierRuleIndex            Unsigned32,
        wmanIfCmnClassifierRulePriority         INTEGER,
        wmanIfCmnClassifierRuleIpTosLow         INTEGER,
        wmanIfCmnClassifierRuleIpTosHigh        INTEGER,
        wmanIfCmnClassifierRuleIpTosMask        INTEGER,
        wmanIfCmnClassifierRuleIpProtocol       Integer32,
        wmanIfCmnClassifierRuleIpSourceAddr     InetAddress,
        wmanIfCmnClassifierRuleIpSourceMask     InetAddress,
        wmanIfCmnClassifierRuleIpDestAddr       InetAddress,
        wmanIfCmnClassifierRuleIpDestMask       InetAddress,
        wmanIfCmnClassifierRuleSourcePortStart  Integer32,
        wmanIfCmnClassifierRuleSourcePortEnd    Integer32,
        wmanIfCmnClassifierRuleDestPortStart    Integer32,
        wmanIfCmnClassifierRuleDestPortEnd      Integer32,
        wmanIfCmnClassifierRuleDestMacAddr      MacAddress,
        wmanIfCmnClassifierRuleDestMacMask      MacAddress,
        wmanIfCmnClassifierRuleSourceMacAddr    MacAddress,
        wmanIfCmnClassifierRuleSourceMacMask    MacAddress,
        wmanIfCmnClassifierRuleEnetProtocolType INTEGER,
        wmanIfCmnClassifierRuleEnetProtocol     Integer32,
        wmanIfCmnClassifierRuleUserPriLow       Integer32,
        wmanIfCmnClassifierRuleUserPriHigh      Integer32,
        wmanIfCmnClassifierRuleVlanId           Integer32,
        wmanIfCmnClassifierRuleState            INTEGER,
        wmanIfCmnClassifierRulePhsSize          Integer32,
        wmanIfCmnClassifierRulePhsMask          OCTET STRING,
        wmanIfCmnClassifierRulePhsVerify        WmanIfPhsRuleVerify,
        wmanIfCmnClassifierRuleIpv6FlowLabel    WmanIfIpv6FlowLabel,
        wmanIfCmnClassifierRuleBitMap           WmanIfClassifierBitMap,
        wmanIfCmnClassifierRuleRowStatus        RowStatus} wmanIfCmnClassifierIndex     OBJECT-TYPE
        SYNTAX              Unsigned32 (1..4294967295)
        MAX-ACCESS  not-accessible
        STATUS              current
        DESCRIPTION
                "An index is assigned to each classifier in the classifiers table"
        ::= { wmanIfCmnClassifierRuleEntry 1 }
```

FIG. 5

700 →
```
wmanIfBsClassifierDestMacAddrTable OBJECT-TYPE
        SYNTAX              Sequence of WmanIfBsClassifierDestMacAddrEntry
        MAX-ACCESS          not-accessible
        STATUS              current
        DESCRIPTION
                "This table contains a list of destination MAC addresses and their
                corresponding address masks."
        REFERENCE
                "Section 11.13.19.3.4.8 in IEEE 802.16-2004"
        ::= { wmanIfBsPacketCs 9 } wmanIfBsClassifierDestMacAddrEntry OBJECT-TYPE
        SYNTAX              wmanIfBsClassifierDestMacAddrEntry
        MAX-ACCESS          not-accessible
        STATUS              current
        DESCRIPTION
                "This table provides one row for each destination MAC address and its
                corresponding address mask, and is indexed by
                wmanIfBsDestMacAddrRuleIndex and wmanIfBsDestMacAddrListIndex."
        INDEX { wmanIfBsDestMacAddrRuleIndex,
        wmanIfBsDestMacAddrListIndex }
        ::= { wmanIfBsClassifierDestMacAddrTable 1 }

WmanIfBsClassifierDestMacAddrEntry::= SEQUENCE {
        wmanIfBsDestMacAddrRuleIndex        Unsigned32,
        wmanIfBsDestMacAddrListIndex        Unsigned32,
        wmanIfBsClassifierDestMacAddr       MacAddress,
        wmanIfBsClassifierDestMacMask       MacAddress} wmanIfBsClassifierRuleDestMacAddr OBJECT-TYPE
        SYNTAX              MacAddress
        MAX-ACCESS          read-create
        STATUS              current
        DESCRIPTION
                "An Ethernet packet matches an entry when its destination MAC address
                bitwise ANDed with wmanIfBsClassifierRuleDestMacMask equals the value of
                wmanIfClassifierRuleDestMacAddr. If the referenced parameter is not present
                in a classifier, this object reports the value of '000000000000'H."
        REFERENCE
                "Subclause 11.13.19.3.4.8 in IEEE Std 802.16-2004"
        ::= { wmanIfBsClassifierRuleEntry 15 } wmanIfBsClassifierRuleDestMacMask OBJECT-TYPE
        SYNTAX              MacAddress
        MAX-ACCESS          read-create
        STATUS              current
        DESCRIPTION
                "An Ethernet packet matches an entry when its destination MAC address
                bitwise ANDed with wmanIfBsClassifierRuleDestMacMask equals the value of
                wmanIfClassifierRuleDestMacAddr. If the referenced parameter is not present
                in a classifier, this object reports the value of '000000000000'H."
        REFERENCE
                "Subclause 11.13.19.3.4.8 in IEEE Std 802.16-2004"
        ::= { wmanIfBsClassifierRuleEntry 16 }
```

FIG. 7

| IP Destination Address Rule Table | | | |
|---|---|---|---|
| IP Destination Address Rule Index | IP Destination Address List Index | IP Destination Address | IP Destination Mask |
| 21 | 1 | 192.168.0.5 | 255.255.255.0 |
| 21 | 2 | 10.3.68.159 | 255.255.255.0 |
| 21 | 3 | 10.3.68.110 | 255.255.255.0 |
| 21 | 4 | 192.168.0.8 | 255.255.255.0 |
| 23 | 1 | 192.168.0.1 | 255.255.255.0 |

Start
↓
1010 — Generate one or more parameter rule tables
↓
1020 — Generate classifier rule table based on parameter rule table(s)
↓
1030 — Transmit classifier rule table and parameter rule table(s) to SS and/or BS
↓
End

900

```
wmanIfBsClassifierIpDestAddrTable OBJECT-TYPE
        SYNTAX              Sequence of WmanIfBsClassifierIpDestAddrEntry
        MAX-ACCESS          not-accessible
        STATUS              current
        DESCRIPTION
                "This table contains a list of IP destination addresses and their
                corresponding address masks."
        REFERENCE
                "Section 11.13.19.3.4.5 in IEEE 802.16-2004"
        ::= { wmanIfBsPacketCs 6 } wmanIfBsClassifierIpDestAddrEntry OBJECT-TYPE
        SYNTAX              wmanIfBsClassifierIpDestAddrEntry
        MAX-ACCESS          not-accessible
        STATUS              current
        DESCRIPTION
                "This table provides one row for each IP destination address and its corresponding
                address mask, and is indexed by wmanIfBsIpDestAddrRuleIndex and
                wmanIfBsIpDestAddrListIndex."
        INDEX   { wmanIfBsIpDestAddrRuleIndex, wmanIfBsIpDestAddrListIndex }
        ::= { wmanIfBsClassifierIpDestAddrTable 1 } wmanIfBsClassifierIpDestAddrEntry::= SEQUENCE {
        wmanIfBsIpDestAddrRuleIndex     Unsigned32,
        wmanIfBsIpDestAddrListIndex     Unsigned32,
        wmanIfBsClassifierIpDestAddr    InetAddress,
        wmanIfBsClassifierIpDestMask    InetAddress} wmanIfBsClassifierRuleIpDestAddr OBJECT-TYPE
        SYNTAX              InetAddress
        MAX-ACCESS          read-create
        STATUS              current
        DESCRIPTION
                "This object specifies the value of the IP Destination Address required for packets to
                match this rule. An IP packet matches the rule when the packet IP destination address
                bitwise ANDed with the wmanIfBsClassifierRuleIpDestMask value equals the
                wmanIfBsClassifierRuleIpDestAddr value. If the referenced parameter is not
                present in a classifier, this object reports the value of 0.0.0.0."
        REFERENCE
                "Subclause 11.13.19.3.4.5 in IEEE Std 802.16-2004"
        ::= { wmanIfBsClassifierRuleEntry 9 } wmanIfBsClassifierRuleIpDestMask OBJECT-TYPE
        SYNTAX              InetAddress
        MAX-ACCESS          read-create
        STATUS              current
        DESCRIPTION
                "This object specifies which bits of a packet's IP Destination Address that are
                compared to match this rule. An IP packet matches the rule when the packet
                destination address bitwise ANDe with the wmanIfBsClassifierRuleIpDestMask
                value equals the wmanIfBsClassifierRuleIpDestAddr value. If the referenced
                parameter is not present in a classifier, this object reports the value of 0.0.0.0."
        REFERENCE
                "Subclause 11.13.19.3.4.5 in IEEE Std 802.16-2004"
        ::= { wmanIfBsClassifierRuleEntry 10 }
```

METHODS AND APPARATUS FOR PROVIDING A PACKET CLASSIFICATION PROTOCOL ASSOCIATED WITH A BROADCAST WIRELESS ACCESS NETWORK

RELATED APPLICATION

This application claims the benefit of U.S. Provisional Application No. 60/673,424 filed Apr. 20, 2005.

TECHNICAL FIELD

The present disclosure relates generally to wireless communication systems, and more particularly, to methods and apparatus for providing a packet classification protocol associated with a broadcast wireless access network.

BACKGROUND

As wireless communication becomes more and more popular, the demand for broadband wireless access has dramatically increased. The 802.16 family of standards were developed by the Institute of Electrical and Electronic Engineers (IEEE) to provide for fixed, portable, and/or mobile broadband wireless access networks such as the IEEE standard (std.) 802.16-2004 (published Sep. 18, 2004), the IEEE std. 802.16e (published Feb. 28, 2006), the IEEE 802.16f (published Dec. 1, 2005), etc. The Worldwide Interoperability for Microwave Access (WiMAX) Forum facilitates the deployment of broadband wireless networks based on the IEEE 802.16 standards. In particular, the WiMAX Forum ensures the compatibility and inter-operability of broadband wireless equipment. For convenience, the terms "802.16" and "WiMAX" may be used interchangeably throughout this disclosure to refer to the IEEE 802.16 suite of air interface standards.

WiMAX is a wireless technology to deliver last-mile broadband connectivity in a larger geographical area than other wireless technology such as Wireless Fidelity (Wi-Fi). In particular, WiMAX technology may provide broadband or high-speed data connection to various geographical locations where wired transmission may be too costly, inconvenient, and/or unavailable. In one example, WiMAX technology may offer greater range and bandwidth to enable Ti-type service to businesses and/or cable/digital subscriber line (DSL)-equivalent access to homes.

BRIEF DESCRIPTION OF THE DRAWINGS

FIG. 3 depicts a portion of an example classifier rule table.

FIG. 4 depicts a high-level language example of code that may be used to implement the example classifier rule table of FIG. 3.

FIG. 5 depicts another high-level language example of code that may be used to implement the example classifier rule table of FIG. 3.

FIG. 6 depicts an example destination media access control (MAC) address rule table.

FIG. 7 depicts a high-level language example of code that may be used to implement the example destination MAC address rule table of FIG. 6.

FIG. 9 depicts a high-level language example of code that may be used to implement the example IP destination address rule table of FIG. 8.

DETAILED DESCRIPTION

In general, methods and apparatus for providing a packet classification protocol associated with a broadcast wireless access network are described herein. The methods and apparatus described herein are not limited in this regard.

Figure 1:
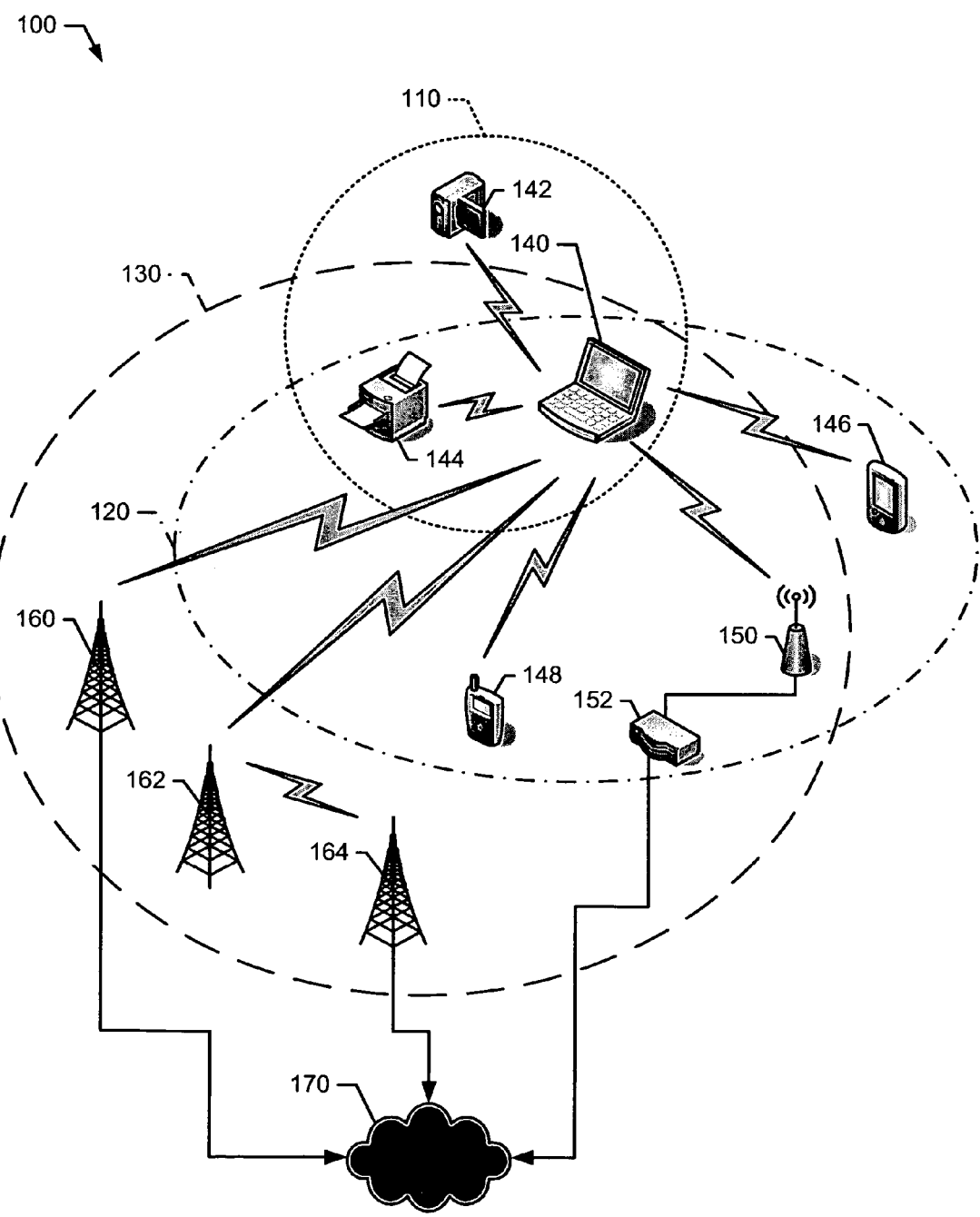
FIG. 1 is a schematic diagram representation of an example wireless communication system according to an embodiment of the methods and apparatus disclosed herein.

Referring to FIG. 1, an example wireless communication system 100 may include one or more wireless communication networks, generally shown as 110, 120, and 130. In particular, the wireless communication system 100 may include a wireless personal area network (WPAN) 110, a wireless local area network (WLAN) 120, and a wireless metropolitan area network (WMAN) 130. Although FIG. 1 depicts three wireless communication networks, the wireless communication system 100 may include additional or fewer wireless communication networks. For example, the wireless communication networks 100 may include additional WPANs, WLANs, and/or WMANs. The methods and apparatus described herein are not limited in this regard.

The wireless communication system 100 may also include one or more subscriber stations, generally shown as 140, 142, 144, 146, and 148. For example, the subscriber stations 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), a set-top box, and/or other suitable relatively stationary, portable, or mobile electronic devices. Although FIG. 1 depicts five subscriber stations, the wireless communication system 100 may include more or less subscriber stations.

The subscriber stations 140, 142, 144, 146, and 148 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), orthogonal frequency division multiple access (OFDMA), and/or other suitable modulation techniques to communicate via wireless links. In one example, the laptop computer 140 may operate in accordance with suitable wireless communication protocols that require very low power such as Bluetooth®, ultra-wide band (UWB), and/or radio frequency identification (RFID) to implement the WPAN 110. In particular, the laptop computer 140 may communicate with devices associated with the WPAN 110 such as the video camera 142 and/or the printer 144 via wireless links.

In another example, the laptop computer 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the laptop computer 140 may communicate with devices associated with the WLAN 120 such as the printer 144, the handheld computer 146 and/or the smart phone 148 via wireless links. The laptop computer 140 may also communicate with an access point (AP) 150 via a wireless link. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 130. For example, the laptop computer 140 may operate in accordance with the 802.16 family of standards developed by IEEE to provide for fixed, portable, and/or mobile broadband wireless access (BWA) networks (e.g., the IEEE std. 802.16-2004, the IEEE std. 802.16e, the IEEE std. 802.16f, etc.) to communicate with base stations, generally shown as 160, 162, and 164, via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, WiMAX Forum, Infrared Data Association (IrDA), Third Generation Partnership Project (3GPP), etc.). The methods and apparatus described herein are not limited in this regard.

The WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 170 via the AP 150 and/or the router 152. In another example, the WMAN 130 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, standards based on these technologies, variations and evolutions of these standards, and/or other suitable wireless communication standards. Further, the wireless communication system 100 may include a wireless mesh network. Although FIG. 1 depicts a WPAN, a WLAN, and a WMAN, the wireless communication system 100 may include other combinations of WPANs, WLANs, WMANs, WWANs, and/or mesh networks. The methods and apparatus described herein are not limited in this regard.

The wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
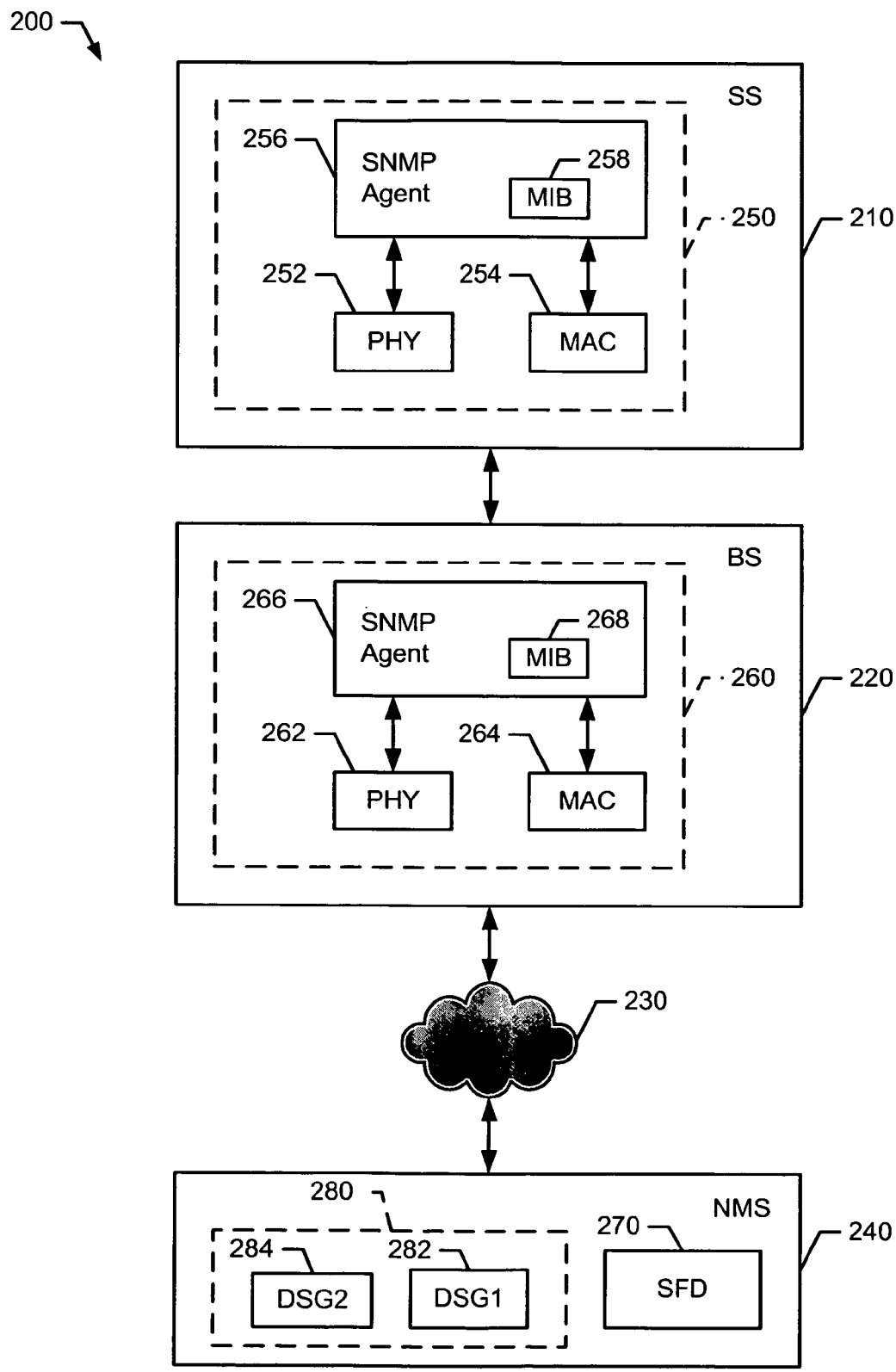
FIG. 2 is a block diagram representation of an example broadband wireless access (BWA) network of the example wireless communication system of FIG. 1.

Turning to FIG. 2, for example, a broadband wireless access (BWA) network 200 may include one or more subscriber stations (SS), generally shown as 210, and one or more base stations (BS), generally shown as 220. The BWA network 200 may also include an Internet Protocol (IP) transport 230, and a network management station (NMS) 240. Although FIG. 2 depicts one subscriber station, the mobile BWA network 200 may include more subscriber stations. Further, while FIG. 2 depicts two base stations, the mobile BWA network 200 may include more or less base stations.

Each of the subscriber station 210 and the base station 220 may include a managed node or device (e.g., network element), generally shown as 250 and 260, respectively. For example, the managed nodes 250 and 260 may be routers, access servers, switches, bridges, hubs, etc. Each of the managed nodes 250 and 260 may include a physical (PHY) layer, generally shown as 252 and 262, respectively, and a media access control (MAC) layer, generally shown as 254 and 264, respectively. Each of the managed nodes 250 and 260 may also include a proxy simple network management protocol (SNMP) agent, generally shown as 256 and 266, respectively, to collect and store managed objects that are made available to the NMS 240 using SNMP. In particular, the SNMP agents 256 and 266 may have knowledge of local management information and translate that information into a form compatible with SNMP. Each of the SNMP agents 256 and 266 may include a management information base (MIB), generally shown as 258 and 268.

As described in further details below, each of the MIBs 258 and 268 may be a database to store information and statistics on the subscriber station 210 and the base station 220, respectively. The information and statistics stored in the MIBs 258 and 268 may be used to keep track of the performance of each network element and to ensure that the network elements of the BWA network 200 are functioning properly. For example, each of the MIBs 258 and 268 may include a classifier rule table defining the packet classifier rules for packet classifier to map services with different quality-of-service (QoS) requirements to appropriate service flows. In one example, a service flow may be a MAC transport service that provides unidirectional transport of packets either to uplink packets transmitted by the SS 210 or to downlink packets transmitted by the BS 220.

The NMS 240 may include a service flow database (SFD) 270 to store information associated with service flow(s) and corresponding QoS. The NMS 240 may also include an element manager 280 to provide such information to the subscriber station 210 and the base station 220. Based on the service flow and QoS information, the element manager 280 may generate one or more packet classifier rules associated with one or more service flows of the BWA network 200. In one example, the element manager 280 may provide information from the service flow database 270 to the subscriber station 210 and/or the base station 220 in response to the subscriber station 210 entering into a coverage area of the base station 220.

The element manager 280 may include a first data structure generator (DSG1) 282 and a second data structure generator (DSG2) 284. Briefly, the first data structure generator 282 may generate one or more parameter rule tables associated with one or more packet parameters of the packet classifier rule(s). Based on the parameter rule table(s), the second data structure generator 284 may generate a classifier rule table.

While FIG. 2 depicts particular components, the BWA network 200 may include other suitable components to operate within a wireless communication network. Further, although the components shown in FIG. 2 are depicted as separate blocks in the BWA network 200, the functions performed by some of these blocks may be integrated within a single semiconductor circuit or may be implemented using two or more separate integrated circuits. For example, although the first data structure generator 282 and the second data structure generator 284 are depicted as separate blocks within the element manager 280, the first data structure generator 282 and the second data structure generator 284 may be integrated into a single component.

The NMS 240 may provision packet classifier rules when service flows are created. In one example, the IEEE std. 802.16-2004 may specify one or more packet classifier rules to include in a list of one or more parameters for each service flow. In particular, the list may include source MAC addresses, destination MAC addresses, source MAC address masks, destination MAC address marks, IP source addresses, IP destination addresses, IP source address marks, IP destination address marks, source protocol ports, and/or destination protocol ports.

As described in detail below, the packet classifier rules may be defined in data structures such as a classifier rule table. In the example of FIG. 3, a classifier rule table 300 may have one or more entries associated with service flows, generally shown as 310, 320, and 325. Although FIG. 3 depicts three entries, the classifier rule table 300 may include more or less entries. Each of the entries 310, 320, and/or 325 may include a service flow identifier field, a classifier index field, a destination MAC address rule field, and/or other suitable parameter rule field(s) (e.g., a source MAC address rule field, an IP destination address rule field, an IP source address rule field, a destination IP port rule field, and/or a source IP port rule field). In one example, the entry 320 may include a service flow identifier field 330, a classifier index field 340, a destination MAC address rule field 350, an IP destination address rule field 360, and/or other suitable fields.

Briefly, the service flow identifier field 330 may identify a service flow. The classifier index field 340 may identify a classifier rule. The destination MAC address rule field 350 may indicate a destination MAC address rule defined by a destination MAC address rule table (e.g., the destination MAC address rule table 600 of FIG. 6). The IP destination address rule field 360 may indicate an IP destination address rule defined by an IP destination address rule table (e.g., the IP destination address rule table 800 of FIG. 8). A packet parameter field may be null if the corresponding packet parameter rule is not used. In one example, the IP destination address field 360 for the entry 320 may be null because an IP destination address rule is not used.

In one example, the classifier rule table 300 may be a WMAN interface (If) BS classifier rule table (e.g., wmanIfBsClassifierRule Table) and/or a WMAN If common (Cmn) classifier rule table (e.g., wmanIfCmnClassifierRule Table) defined to support the IEEE 802.16 family of standards (e.g., IEEE stds. 802.16-2004 and/or 802.16f). In particular, the high-level language code 400 illustrated in FIG. 4 may be one example to configure the wmanIfBsClassifierRule Table, and the high-level language code 500 illustrated in FIG. 5 may be one example to configure the wmanIfCmnClassifierRule Table. For example, the wmanIfBsClassifierRule Table based on the high-level language code 400 may include a service flow identifier field (e.g., wmanIfBsSfId), a classifier index field (e.g., wmanIfBsClassifierIndex), a destination MAC address rule field (e.g., wmanIfBsClassifierDestMacAddrRule), an IP destination address rule field (e.g., wmanIfBsClassifierIpDestAddrRule), and/or other suitable fields. In a similar manner, the wmanIfCmnClassifierRule Table based on the high-level language code 500 may include a service flow identifier field (e.g., wmanIfCmnSfId), a classifier index field (e.g., wmanIfCmnClassifierIndex), an IP destination address rule field (e.g., wmanIfCmnClassifierDestMacAddrRule), an IP destination address rule field (e.g., wmanIfCmnClassifierIpDestAddrRule), and/or other suitable fields.

Referring to FIG. 2, for example, the NMS 240 may provide the base station 220 with the wmanIfBsClassifierRule Table prior to the base station 220 detecting that the subscriber station 210 entered into the BWA network 200. The base station 220 may store the wmanIfBsClassifierRule Table in the MIB 268. When the subscriber station 210 enters into the BWA network 200, the base station 220 may populate the classification rule information into the wmanIfCmnClassifierRule Table in the subscriber station 210 and the base station 220. Accordingly, the subscriber station 210 may store the wmanIfCmnClassifierRule Table in the MIB 258, and the base station 220 may store the wmanIfCmnClassifierRule Table in the MIB 268.

To reduce amount of memory space in the MIBs 258 and 268 to store classifier rule tables at the subscriber station 210 and/or the base station 220, respectively, the NMS 240 may generate a destination MAC address table to store information associated with destination MAC addresses and marks. Turning to FIG. 6, for example, the destination MAC address rule table 600 may include information associated with destination MAC addresses and corresponding address marks. The destination MAC address table 600 may include one or more entries, generally shown as 610, 620, 630, 640, 650, and 655. Although FIG. 6 depicts six entries, the destination MAC address rule table 600 may include more or less entries. Each of the entries 610, 620, 630, 640, 650, and/or 655 may include a destination MAC address rule index field, a destination MAC address list index field, a destination MAC address field, and a destination MAC address mask field, generally shown as 660, 670, 680, and 690, respectively.

In particular, the destination MAC address rule index field 660 may correspond to the destination MAC address rule field 350 (FIG. 3) of the classifier rule table 300 (FIG. 3). The destination MAC address list index field 670 may indicate a sub-rule of the destination MAC address rule defined by the destination MAC address rule table 600. Each destination MAC address list index may correspond to a particular destination MAC address and mask. For example, an index of "3" may correspond to a destination MAC address of "df:24:5a:58" whereas an index of "5" may correspond to a destination MAC address of "df:24:5a:5a." The destination MAC address field 680 may provide a destination MAC address. The destination MAC address mask field 690 may provide a MAC address mask value associated with the destination MAC address of the destination MAC address field 680.

In one example, the destination MAC address rule table 600 may be a wmanIfBsClassifierDestMacAddr Table and/or a wmanIfCmnClassifierDestMacAddr Table defined to support the IEEE 802.16 family of standards (e.g., IEEE stds. 802.16-2004 and/or 802.16f). In particular, the high-level language code 700 illustrated in FIG. 7 may be one example to configure the wmanIfBsClassifierDestMacAddr Table. Each entry of the wmanIfBsClassifierDestMacAddr Table may include one or more fields associated with wmanIfBsDestMacAddrRuleIndex, wmanIfBsDestMacAddrListIndex, wmanIfBsClassifierDestMacAddr, and wmanIfBsClassifierDestMacMask. The wmanIfCmnClassifierDestMacAddr Table may be configured by code that is similar to the high-level language code 700.

Turning to FIG. 2 again, for example, the NMS 240 may provide the base station 210 with the wmanIfBsClassifierDestMacAddr Table prior to the base station 220 detecting that the subscriber station 210 entered into the BWA network 200. The base station 220 may store the wmanIfBsClassifierDestMacAddr Table in the MIB 268. Each entry of the wmanIfBsClassifierDestMacAddr Table may include one or more fields associated with wmanIfBsDestMacAddrRuleIndex, wmanIfBsDestMacAddrListIndex, wmanIfBsClassifierDestMacAddr, and wmanIfBsClassifierDestMacMask. When the subscriber station 210 enters into the BWA network 200, the base station 220 may populate the destination MAC address rule information into the wmanIfCmnClassifierDestMacAddr Table in the subscriber station 210 and the base station 220. Accordingly, the subscriber station 210 and the base station 220 may store the wmanIfCmnClassifierDestMacAddr Table in the MIBs 258 and 268, respectively.

Figures 8, 10:
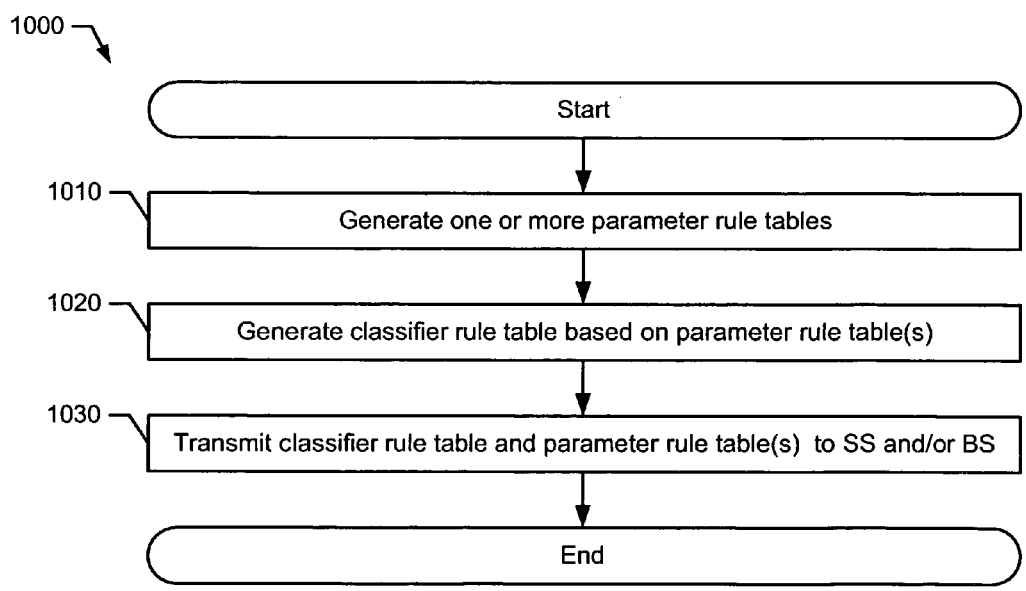
FIG. 8 depicts an example Internet Protocol (IP) destination address rule table.
FIG. 10 is a flow diagram representation of one manner in which an example network management station of FIG. 2 may be configured to providing a packet classification protocol.

In the example of FIG. 8, the IP destination address rule table 800 may include information associated with IP destination addresses and corresponding address masks. The IP destination address rule table 800 may include one or more entries, generally shown as 810, 820, 830, 840, and 850. Although FIG. 8 depicts five entries, the IP destination address rule table 800 may include more or less entries. Each of the entries 810, 820, 830, 840 and/or 850 may include an IP destination address rule index field, an IP destination address list index field, an IP destination address field, and an IP destination address mask field, generally shown as 860, 870, 880, and 890, respectively.

In particular, the IP destination address rule index field 860 may correspond to the IP destination address rule field 360 (FIG. 3) of the classifier rule table 300 (FIG. 3). The IP destination address list index field 870 may indicate a subrule of the IP destination address rule defined by the IP destination address rule table 800. Each IP destination address list index may correspond to a particular IP destination address and mask. For example, an index of "2" may correspond to an IP destination address of "10.3.68.159" whereas an index of "4" may correspond to an IP destination address of "192.168.0.8." The IP destination address field 880 may provide an IP destination address. The IP destination address mask field 890 may provide an IP address mask value associated with the IP destination address of the IP destination address field 880.

In one example, the IP destination address rule table 800 may be a wmanIfBsClassifierIpDestAddr Table and/or a wmanIfCmnClassifierIpDestAddr Table defined to support the IEEE 802.16 family of standards (e.g., IEEE stds. 802.16-2004 and/or 802.16f). In particular, the high-level language code 900 illustrated in FIG. 9 may be one example to configure the wmanIfBsClassifierIpDestAddr Table. Each entry of the wmanIfBsClassifierIpDestAddr Table may include one or more fields associated with wmanIfBsIpDestAddrRuleIndex, wmanIfBsIpDestAddrListIndex, wmanIfBsClassifierIpDestAddr, and wmanIfBsClassifierIpDestMask. The wmanIfCmnClassifierIpMacAddr Table may be configured by code that is similar to the high-level language code 900.

Referring to FIG. 2 again, for example, the NMS 240 may provide the base station 210 with the wmanIfBsClassifierIpDestAddr Table prior to the base station 220 detecting that the subscriber station 210 entered into the BWA network. The base station 220 may store the wmanIfBsClassifierIpDestAddr Table in the MIB 268. When the subscriber station 210 enters into the BWA network 200, the base station 220 may populate the IP destination address rule information into the wmanIfCmnClassifierIpDestAddr Table in the subscriber station 210 and the base station 220. Accordingly, the subscriber station 210 and the base station 220 may store the wmanIfCmnClassifierIpDestAddr Table in the MIBs 258 and 268, respectively.

Although the above examples depict a parameter rule table for destination MAC addresses and masks and a table for IP source addresses and masks, the NMS 240 may generate a parameter rule table for other parameters associated with the packet classifier rules such as MAC addresses, MAC address masks, IP addresses, IP address masks, and/or protocol ports. For example, the NMS 240 (e.g., via the first data structure generator 282) may generate one or more tables for the following packet parameters: source MAC addresses and masks (e.g., a source MAC address rule table such as wmanIfBsClassifierSourceMacAddr Table and/or wmanIfCmnClassifierSourceMacAddr Table), IP source addresses and masks (e.g., an IP source address rule table such as wmanIfBsClassifierIpSourceAddr Table and/or wmanIfCmnClassifierIpSourceAddr Table), destination IP port numbers (e.g., a destination IP port rule table such as wmanIfBsClassifierDestIpPort Table and/or wmanIfCmnClassifierDestIpPort Table), and/or source IP port numbers (e.g., a source IP port rule table such as wmanIfBsClassifierSourceIpPort Table and/or wmanIfCmnClassifierSourceIpPort Table).

In particular, the source MAC address rule table may include one or more entries with a source MAC address rule index field, a source MAC address list index field, a source MAC address value field, and/or a source MAC address mask value field. The IP source address rule table may include one or more entries with an IP source address rule index field, an IP source address list index field, an IP source address value field, and/or an IP source address mask value field. The destination IP port rule table may include one or more entries with a destination IP port rule index field, a destination IP port list index field, and/or a destination IP port value field. The source IP port rule table may include one or more entries with a source IP port rule index field, a source IP port list index field, and/or a source IP port value field.

Further, while the above examples depict defining packet classifier rules in tables, the methods and apparatus described herein are readily applicable to define packet classifier rules in other suitable data structures. For example, the methods and apparatus described herein may be readily applicable to lists, trees, arrays, etc.

FIG. 10 depicts one manner in which the example NMS 240 of FIG. 2 may be configured to provide a packet classification protocol as described in connection with FIG. 10. The example process 1000 may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 10, these actions can be performed in other temporal sequences. Again, the example process 1000 is merely provided and described in conjunction with the systems and/or apparatus of FIGS. 1, 2, and/or 3 as an example of one way to configure a network management station to provide a packet classification protocol.

In the example of FIG. 10, the process 1000 may begin with the NMS 240 (e.g., via the first data structure generator 282) generating one or more parameter rule data structures associated with one or more packet parameters of one or more packet classifier rules (block 1010). As noted above, for example, the packet parameters may include destination MAC address, destination MAC address mask, source MAC address, source MAC address mask, IP destination address, IP destination address mask, IP source address, IP source address mask, destination IP port, and/or source IP port. In one example, the NMS 240 may generate the destination MAC address rule table 600 of FIG. 6. In another example, the NMS 240 may generate the IP destination address rule table 800 of FIG. 8.

Based on the one or more parameter rule data structures, the NMS 240 (e.g., via the second data structure generator 284) may generate a classifier rule data structure with one or more entries (block 1020). In particular, each entry of the classifier rule data structure may include one or more fields for referring to the parameter rule data structure(s). Referring to FIG. 3, for example, the classifier rule table 300 may include fields associated with parameter rule tables such as a destination MAC address rule table, a source MAC address rule table, an IP destination address rule table, an IP source address rule table, a destination IP port rule table, and/or a source IP port rule table. In one example, the field 350 of the entry 320 may refer to the destination MAC address rule table 600. In another example, the field 360 of the entry 320 may refer to the IP source address rule table 800.

Accordingly, the NMS 240 may transmit the classifier rule table 300 and one or more parameter rule table(s) to the SS 210 and/or the BS 220 to use for processing service flows (block 1030). The SS 210 and/or the BS 220 may store the classifier rule table 300 and one or more parameter rule table(s) in the MIBs 258 and/or 268, respectively. The methods and apparatus described herein are not limited in this regard.

Although the methods and apparatus disclosed herein are described with respect to a BWA network, the methods and apparatus disclosed herein may be applied to other suitable types of wireless communication networks. For example, the methods and apparatus disclosed herein may be readily applicable to WPANs, WLANs, WMANs, WWANs, and/or mesh networks.

Figure 11:
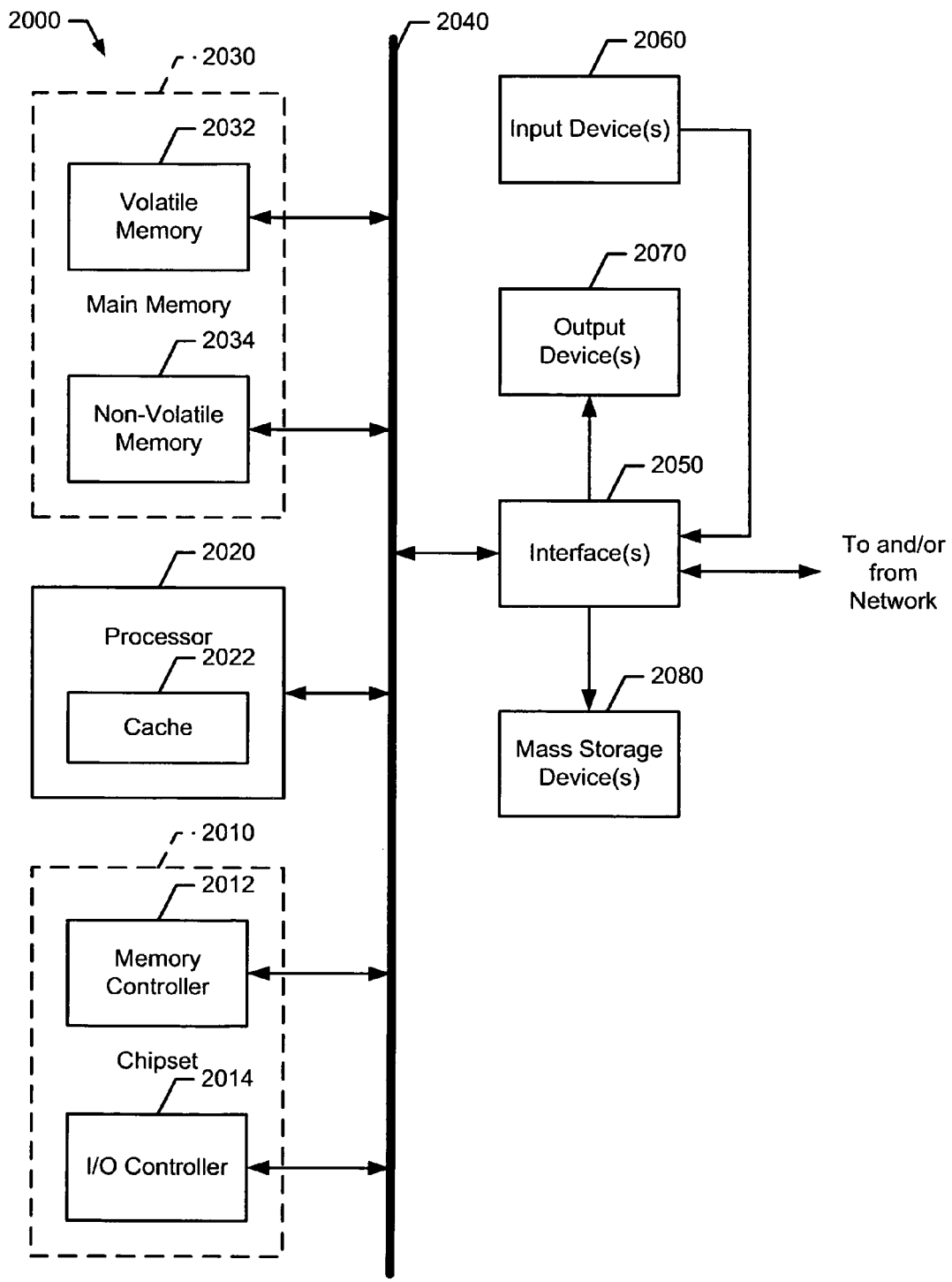
FIG. 11 is a block diagram representation of an example processor system that may be used to implement the example network management station of FIG. 2.

FIG. 11 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 11 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WPAN components, WLAN components, WMAN components, WWAN components, and/or other suitable processing components. For example, the processor 2020 may be implemented using one or more of the Intel® Core™ technology, Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include one or more communication devices such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 11 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
   generating, by a network management station, one or more parameter rule data structures, including a destination media access control (MAC) address rule table, as defined in a Management Information Base (MIB):
   generating, by the network management station, a packet classifier rule data structure defined in the MIB having one or more entries of packet classifier rules associated with one or more service flows of a broadband wireless network, wherein at least one entry of the packet classifier rules includes a destination MAC address rule field that refers to an entry in the destination MAC address rule table of the one or more parameter rule data structures; and
   transmitting, by the network management station, the packet classifier rule data structure and the one or more parameter rule data structures to a base station or a subscriber station within the broadband wireless network in accordance with Simple Network Management Protocol (SNMP).

2. A method as defined in claim 1, wherein generating the one or more parameter rule data structures comprises generating a parameter rule table based on at least one of service flow information or quality-of-service information from a service flow database.

3. A method as defined in claim 1, wherein generating the one or more parameter rule data structures comprises generating a parameter rule table having at least one of parameter rule index information, parameter list index information, or parameter value information.

4. A method as defined in claim 1, wherein generating the one or more parameter rule data structures comprises generating a parameter rule table having information associated with at least one of destination media access control (MAC) addresses, destination MAC address masks, source MAC addresses, source MAC address masks, Internet Protocol (IP) source addresses, IP source address masks, IP destination addresses, IP destination address masks, source protocol ports, or destination protocol ports.

5. A method as defined in claim 1, wherein the destination media access control (MAC) address rule table has one or more entries with at least one of a destination MAC address rule index field, a destination MAC address list index field, a destination MAC address value field, or a destination MAC address mask value field.

6. A method as defined in claim 1, wherein generating the one or more parameter rule data structures comprises generating a source media access control (MAC) address rule table having one or more entries with at least one of a source MAC address rule index field, a source MAC address list index field, a source MAC address value field, or a source MAC address mask value field.

7. A method as defined in claim 1, wherein generating the one or more parameter rule data structures comprises generating an Internet Protocol (IP) destination address rule table having one or more entries with at least one of an IP destination address rule index field, an IP destination address list index field, an IP destination address value field, or an IP destination address mask value field.

8. A method as defined in claim 1, wherein generating the one or more parameter rule data structures comprises generating an Internet Protocol (IP) source address rule table having one or more entries with at least one of an IP source address rule index field, an IP source address list index field, an IP source address value field, or an IP source address mask value field.

9. A method as defined in claim 1, wherein generating the one or more parameter rule data structures comprises generating a source Internet Protocol (IP) port rule table having one or more entries with at least one of a source IP port rule index field, a source IP port list index field, or a source IP port value field.

10. A method as defined in claim 1, wherein generating the one or more parameter rule data structures comprises generating a destination Internet Protocol (IP) port rule table having one or more entries with at least one of a destination IP port rule index field, a destination IP port list index field, or a destination IP port value field.

11. A method as defined in claim 1, wherein generating the classifier rule data structure comprises generating a classifier rule table having service flow identifier information, classifier index information, and at least one of destination media access control (MAC) address rule information, source MAC address rule information, Internet Protocol (IP) source address rule information, IP destination address rule information, source IP port rule information, or destination IP port rule information.

12. A method as defined in claim 1, wherein the broadband wireless access network comprises a wireless packet-based network based on Worldwide Interoperability for Microwave Access (WiMAX) technology.

13. An article of manufacture comprising:
    a storage medium; and
    a plurality of programming instructions stored on the storage medium and configured to program a broadband wireless network device to:
    generate one or more parameter rule data structures, including a destination media access control (MAC) address rule table, as defined in a Management Information Base (MIB), and
    generate a packet classifier rule data structure defined in the MIB having one or more entries of packet classifer rules associated with one or more service flows of a broadband wireless network, wherein at least one entry of packet classifier rules includes a destination MAC address rule field that refers to an entry in the destination MAC address rule table of the one or more parameter data structures.

14. An article of manufacture as defined in claim 13, wherein the plurality of programming instructions are configured to generate the one or more parameter rule data structures by generating a parameter rule table having at least one of parameter rule index information, parameter list index information, or parameter value information.

15. An article of manufacture as defined in claim 13, wherein the plurality of programming instructions are configured to generate the one or more parameter rule data structures by generating a parameter rule table having information associated with at least one of destination media access control (MAC) addresses, destination MAC address masks, source MAC addresses, source MAC address masks, Internet Protocol (IP) source addresses, IP source address masks, IP destination addresses, IP destination address masks, source protocol ports, or destination protocol ports.

16. An article of manufacture as defined in claim 13, wherein the plurality of programming instructions are configured to generate the one or more parameter rule data structures by generating a parameter rule table having one or more entries with at least one of a destination MAC address rule index field, a destination MAC address list index field, a destination MAC address value field, a destination MAC address mask value field, a source MAC address rule index field, a source MAC address list index field, a source MAC address value field, a source MAC address mask value field, an IP destination address rule index field, an IP destination address list index field, an IP destination address value field, an IP destination address mask value field, an IP source address rule index field, an IP source address list index field, an IP source address value field, an IP source address mask value field, a source IP port rule index field, a source IP port list index field, a source IP port value field, a destination IP port rule index field, a destination IP port list index field, or a destination IP port value field.

17. An article of manufacture as defined in claim 13, wherein the plurality of programming instructions are configured to generate the classifier rule data structure by generating a classifier rule table having service flow identifier information, classifier index information, and at least one of destination media access control (MAC) address rule information, source MAC address rule information, Internet Protocol (IP) source address rule information, IP destination address rule information, source IP port rule information, or destination IP port rule information.

18. An apparatus comprising:
a first data structure generator to generate one or more parameter rule data structures, including a destination media access control (MAC) address rule table, as defined in a Management Information Base (MIB);
a second data structure generator operatively coupled to the first data structure generator to generate a packet classifier rule data structure defined in the MIB having one or more entries of packet classifer rules associated with one or more service flows of a broadband wireless network, wherein at least one entry of the packet classifier rules includes a destination MAC address rule field that refers to an entry in the destination MAC address rule table of the one or more parameter rule data structures; and
an element manager to transmit the one or more parameter rule data structures and the packet classifier rule data structure to a base station or a subscriber station within the broadband wireless network in accordance with Simple Network Management Protocol (SNMP).

19. An apparatus as defined in claim 18, wherein the one or more parameter rule data structures comprises a parameter rule table having at least one of parameter rule index information, parameter list index information, or parameter value information.

20. An apparatus as defined in claim 18, wherein the one or more parameter rule data structures comprises a parameter rule table having information associated with at least one of destination media access control (MAC) addresses, destination MAC address masks, source MAC addresses, source MAC address masks, Internet Protocol (IP) source addresses, IP source address masks, IP destination addresses, IP destination address masks, source protocol ports, or destination protocol ports.

21. An apparatus as defined in claim 18, wherein the one or more parameter rule data structures comprises a parameter rule table having one or more entries with at least one of a destination MAC address rule index field, a destination MAC address list index field, a destination MAC address value field, a destination MAC address mask value field, a source MAC address rule index field, a source MAC address list index field, a source MAC address value field, a source MAC address mask value field, an IP destination address rule index field, an IP destination address list index field, an IP destination address value field, an IP destination address mask value field, an IP source address rule index field, an IP source address list index field, an IP source address value field, an IP source address mask value field, a source IP port rule index field, a source IP port list index field, a source IP port value field, a destination IP port rule index field, a destination IP port list index field, or a destination IP port value field.

22. An apparatus as defined in claim 18, wherein the classifier rule data structures comprises a classifier rule table having service flow identifier information, classifier index information, and at least one of destination media access control (MAC) address rule information, source MAC address rule information, Internet Protocol (IP) source address rule information, IP destination address rule information, source IP port rule information, or destination IP port rule information.

23. An apparatus as defined in claim 18 further comprising a service flow database to store at least one of service flow information or quality-of-service information associated with the one or more service flows, wherein the first data structure generator generates the one or more parameter rule data structures based on the at least one of service flow information or quality-of-service information.

24. A system comprising:
a flash memory to store at least one of service flow information or quality-of-service information associated with one or more service flows of a broadband wireless access network; and
a processor operatively coupled to the flash memory to generate one or more parameter rule data structures, including a destination media access control (MAC) address rule table, as defined in a Management Information Base (MIB), and to generate a packet classifier rule data structure defined in the MIB having one or more entries of packet classifer rules associated with one or more service flows, wherein at least one entry of the packet classifier rules includes a destination MAC address rule field that refers to an entry in the destination MAC address rule table of the one or more parameter rule data structures.

25. A system as defined in claim 24, wherein the one or more parameter rule data structures comprises a parameter rule table having at least one of parameter rule index information, parameter list index information, or parameter value information.

26. A system as defined in claim 24, wherein the one or more parameter rule data structures comprises a parameter rule table having information associated with at least one of destination media access control (MAC) addresses, destination MAC address masks, source MAC addresses, source MAC address masks, Internet Protocol (IP) source addresses, IP source address masks, IP destination addresses, IP destination address masks, source protocol ports, or destination protocol ports.

27. A system as defined in claim 24, wherein the one or more parameter rule data structures comprises a parameter rule table having one or more entries with at least one of a destination MAC address rule index field, a destination MAC address list index field, a destination MAC address value field, a destination MAC address mask value field, a source MAC address rule index field, a source MAC address list index field, a source MAC address value field, a source MAC address mask value field, an IP destination address rule index field, an IP destination address list index field, an IP destination address value field, an IP destination address mask value field, an IP source address rule index field, an IP source address list index field, an IP source address value field, an IP source address mask value field, a source IP port rule index field, a source IP port list index field, a source IP port value field, a destination IP port rule index field, a destination IP port list index field, or a destination IP port value field.

28. A system as defined in claim 24, wherein the classifier rule data structures comprises a classifier rule table having service flow identifier information, classifier index information, and at least one of destination media access control (MAC) address rule information, source MAC address rule information, Internet Protocol (IP) source address rule information, IP destination address rule information, source IP port rule information, or destination IP port rule information.

* * * * *